United States Patent [19]
Manico et al.

[11] Patent Number: 6,049,371
[45] Date of Patent: Apr. 11, 2000

[54] IMAGE PRINT HAVING ONE OR MORE POSITIVE IMAGES AND METHOD FOR MAKING SAME

[75] Inventors: Joseph Anthony Manico, Rochester; David Lynn Patton, Webster; Edward Joseph Walsh, Jr., Pittsford, all of N.Y.

[73] Assignee: Eastman Kodak Company, Rochester, N.Y.

[21] Appl. No.: 08/218,279

[22] Filed: Mar. 25, 1994

[51] Int. Cl.⁷ ................................................. G03B 27/52
[52] U.S. Cl. ......................................................... 355/41
[58] Field of Search ............................. 355/41; 358/540, 358/483; 348/913

[56] References Cited

U.S. PATENT DOCUMENTS

| | | | |
|---|---|---|---|
| 4,659,210 | 4/1987 | Sugiura et al. | 355/14 R |
| 4,875,768 | 10/1989 | Hirasawa et al. | 353/27 |
| 4,896,208 | 1/1990 | Moriya et al. | 358/78 |
| 4,912,503 | 3/1990 | Sawaki et al. | 355/41 X |
| 4,933,773 | 6/1990 | Shiota et al. | 358/302 |
| 4,942,427 | 7/1990 | Rokov et al. | 355/41 X |
| 4,951,086 | 8/1990 | Hicks | 355/41 |
| 4,953,012 | 8/1990 | Abe | 358/75 |
| 5,028,993 | 7/1991 | Kobori et al. | 358/78 |
| 5,093,682 | 3/1992 | Hicks | 355/41 X |
| 5,184,227 | 2/1993 | Foley | 358/302 |
| 5,274,422 | 12/1993 | Yoshikawa | 355/77 |
| 5,287,141 | 2/1994 | Yoshikawa | 355/40 |
| 5,289,229 | 2/1994 | Manico et al. | 355/41 |
| 5,563,984 | 10/1996 | Tanibata | 395/105 |

FOREIGN PATENT DOCUMENTS

| | | | |
|---|---|---|---|
| 4316618A1 | 5/1993 | Germany | G03B 27/52 |
| 5-27406 | 2/1993 | Japan | G03D 15/00 |

OTHER PUBLICATIONS

Japanese Patent Abstracts of Japan JP2015375, Koyakata Koji, Image Information Storage Device, Jan. 19, 1990.
Japanese Patent Abstracts of Japan JP5027406, Yoshikawa Sumio, Index Print, Feb. 5, 1993.
Japanese Patent Abstracts of Japan JP5241251, Ikegami Shinpei, Photographic Film and Photographic Printing Method, Sep. 21, 1993.
Japanese Patent Abstracts of Japan JP5045854, Uekusa Tadashi, Index Print, Feb. 26, 1993.

*Primary Examiner*—Safet Metjahic
*Assistant Examiner*—Christopher Mahoney
*Attorney, Agent, or Firm*—David A. Howley

[57] ABSTRACT

An image print includes one or more positive images representing one or more corresponding images located on an image recording medium. An alphabetic description is provided on the image print for at least one of the one or more positive images which identifies a designated aspect ratio for at least one of the one or more corresponding images.

6 Claims, 4 Drawing Sheets

IMAGE PRINT HAVING ONE OR MORE POSITIVE IMAGES AND METHOD FOR MAKING SAME

CROSS-REFERENCE TO RELATED APPLICATION

Reference is made to commonly assigned copending applications Ser. No. 08/040,398, entitled Index Print Which Indicates That an Image Stored on an Image Bearing Medium Was Not Properly Recorded and filed in the name of Manico, and Ser. No. 08/079,658, entitled High Speed Index Printer and filed in the names of Manico et al., each of which are assigned to the assignee of this application.

FIELD OF THE INVENTION

The invention relates generally to the field of photography, and in particular to image prints. More specifically, the invention relates to an image print having one or more positive images.

BACKGROUND OF THE INVENTION

Japanese Kokai patent Application No. HEI 5[1993]-27406 discloses an index print containing a plurality of positive images. Vertical and/or horizontal lines can be provided over a positive image on the index print to indicate a nonstandard designated aspect ratio of a corresponding image stored on a negative film. The aspect ratio is obtained by (1) scanning a magnetic strip on the film or (2) operator input. For example, a pair of horizontal lines are printed across the upper and lower portions of the positive image to indicate a vertically cropped panoramic (PAN) designated aspect ratio. Alternatively, dots can be provided at the periphery of a positive image to indicate the designated aspect ratio. In another embodiment, the positive images are printed in a cropped manner on the index print at the designated aspect ratio.

A problem with the foregoing arrangement is that a customer may not be able to discern the correct aspect ratio by merely observing the lines, dots or cropped positive image on the index print. For example, an HDTV (High Definition Television) aspect ratio and certain telephoto (TELE) aspect ratios will have nearly identical lines, dots or cropped positive images on the index print. The customer may not be able to tell if the designated aspect ratio was HDTV or TELE, thereby confusing the customer. This customer confusion is also present with regular service prints.

A further problem is the manner in which the aspect ratio is obtained. Requiring an operator to input the aspect ratio information is inefficient. Additionally, many films do not have a magnetic strip on which the aspect ratio information can be recorded. Further, many cameras do not have the capability to record a designated aspect ratio on the film or a magnetic strip on the film. Consequently, the apparatus disclosed in the above-referenced Japanese Kokai can only operate (1) on films with magnetic recording strips or (2) with operator intervention.

SUMMARY OF THE INVENTION

The present invention is directed to overcoming one or more of the problems set forth above. Briefly summarized, according to one aspect of the present invention, an image print includes one or more positive images representing one or more corresponding images located on an image recording medium. An alphabetic description is provided on the image print for at least one of the one or more positive images which identifies a designated aspect ratio for at least one of the one or more corresponding images.

By providing an alphabetic description on the image print to indicate the designated aspect ratio, a customer will clearly be able to understand which aspect ratio has been designated. For example, the customer will be able to tell the difference between an HDTV aspect ratio and a TELE aspect ratio.

According to another aspect of the present invention, a method of making an image print having one or more positive images representing one or more corresponding images located on an image recording medium is provided. The one or more corresponding images is automatically analyzed to determine an aspect ratio for each of the one or more corresponding images. A positive image for each of the one or more corresponding images is recorded onto a recording sheet. One or more visible indicators are provided on the recording sheet and are associated respectively with one or more positive images for indicating the aspect ratio of the one or more corresponding images.

By automatically analyzing the image(s) stored on the image storage medium, the aspect ratio of the image(s) can be determined (1) regardless of the type of image storage medium and (2) without operator intervention. As such, the present invention can be utilized with a wide variety of image storage media (e.g. films) and without operator intervention.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
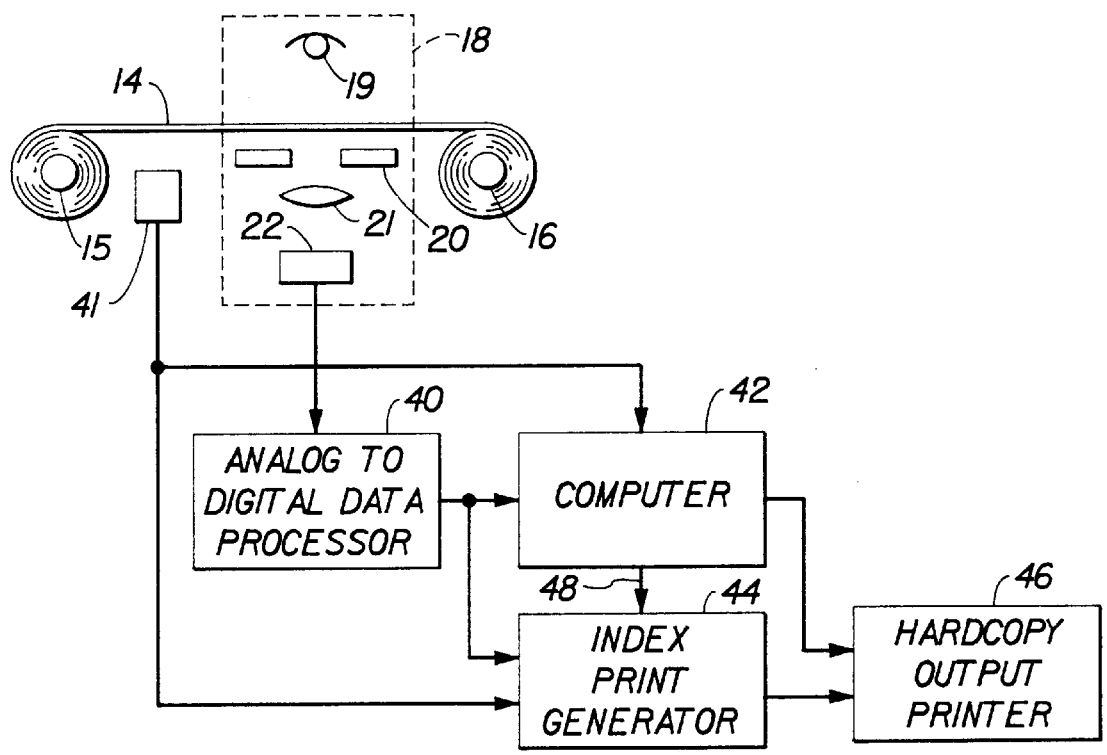
FIG. 1 is a schematic diagram of an image printer.

In FIG. 1, an image printer for producing image prints according to the present invention is shown. In the illustrated printer, an image recording medium, such as a roll of processed photographic film 14, is advanced by transport means (not shown) from a supply reel 15 through a film scanner 18 to a take-up reel 16. Exposure determination scanner 18 is typically provided with a light source 19 to shine light through a film frame on film 14 positioned in frame gate 20. The resultant image light is focused by lens 21 onto a scanning image sensor 22 which may take the form of any of a variety of scanning devices such as a linear or two dimensional area array charge coupled device (CCD).

Although scanner 18 is shown with optical focusing of the film image onto sensor 22, it will be appreciated that scanner 18 may employ virtual contact of the type disclosed in commonly assigned U.S. Pat. No. 5,153,715 entitled COLOR FILM SCANNING APPARATUS, the disclosure of which is incorporated herein by reference. With a virtual contact scanner, optical focusing lens 21 is eliminated and scanner 22 preferably comprises a tri-linear CCD device which is placed closely adjacent the underside of film 14. In this arrangement, scanning sensor 22 comprises a 480 element by 3 line color linear CCD imager with each line being provided with a color filter to be individually responsive to separate colors in the image. In operation, the sensor images a predetermined film width, such as a 35 mm format negative, with the film motion providing the page or lengthwise scan of the film frame image. Thus, image data, including image density, is generated in a 480V by 252 H (vertical by horizontal) format.

The output of sensor 22, in a scanned pixel analog signal form, is applied to an analog-to-digital data processor 40 to be converted in known manner into digital values representative of the analog pixel information received from scanner sensor 22. The digital values are forwarded to a computer 42.

Figure 2:
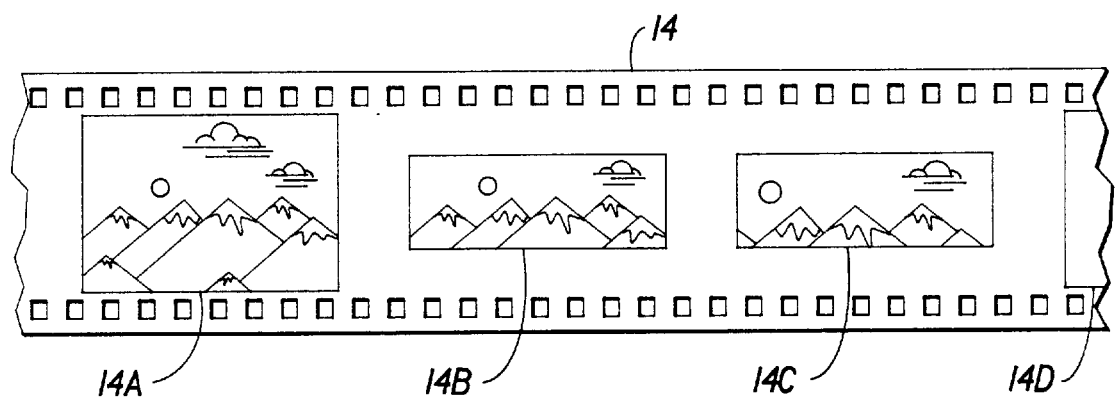
FIG. 2 is a diagramatic illustration of a film negative having images recorded thereon at different aspect ratios.

As illustrated in FIG. 2, exposed film 14 includes a mixture of full frame and panoramic frame exposures. Film 14 can include images having other aspect ratios, such as a High Definition Television (HDTV) format or a Telephoto format (TELE). The aspect ratio of each image on film 14 is designated by a camera user prior to recording the image on film 14. Note specifically that the full frame exposures illustrated, specifically images 14*a* and 14*d*, are substantially larger widthwise than the panoramic images 14*b* and 14*c*. In fact, in an actual embodiment, the standard full frame image is 24 mm by 36 mm while the panoramic image is 12 mm by 36 mm.

The image densities at an array of points or spots for a particular film frame are analyzed by computer 42. Computer 42 has been designed to include software which acts on the image density information provided by scanner 18 in a way that allows the computer to determine the aspect ratio (height/width) of the image recorded on each film frame. This is accomplished by incorporating the appropriate software into the computer, which software is illustrated by means of the flowchart illustrated in FIG. 3, as will be discussed in more detail below.

Figure 3:
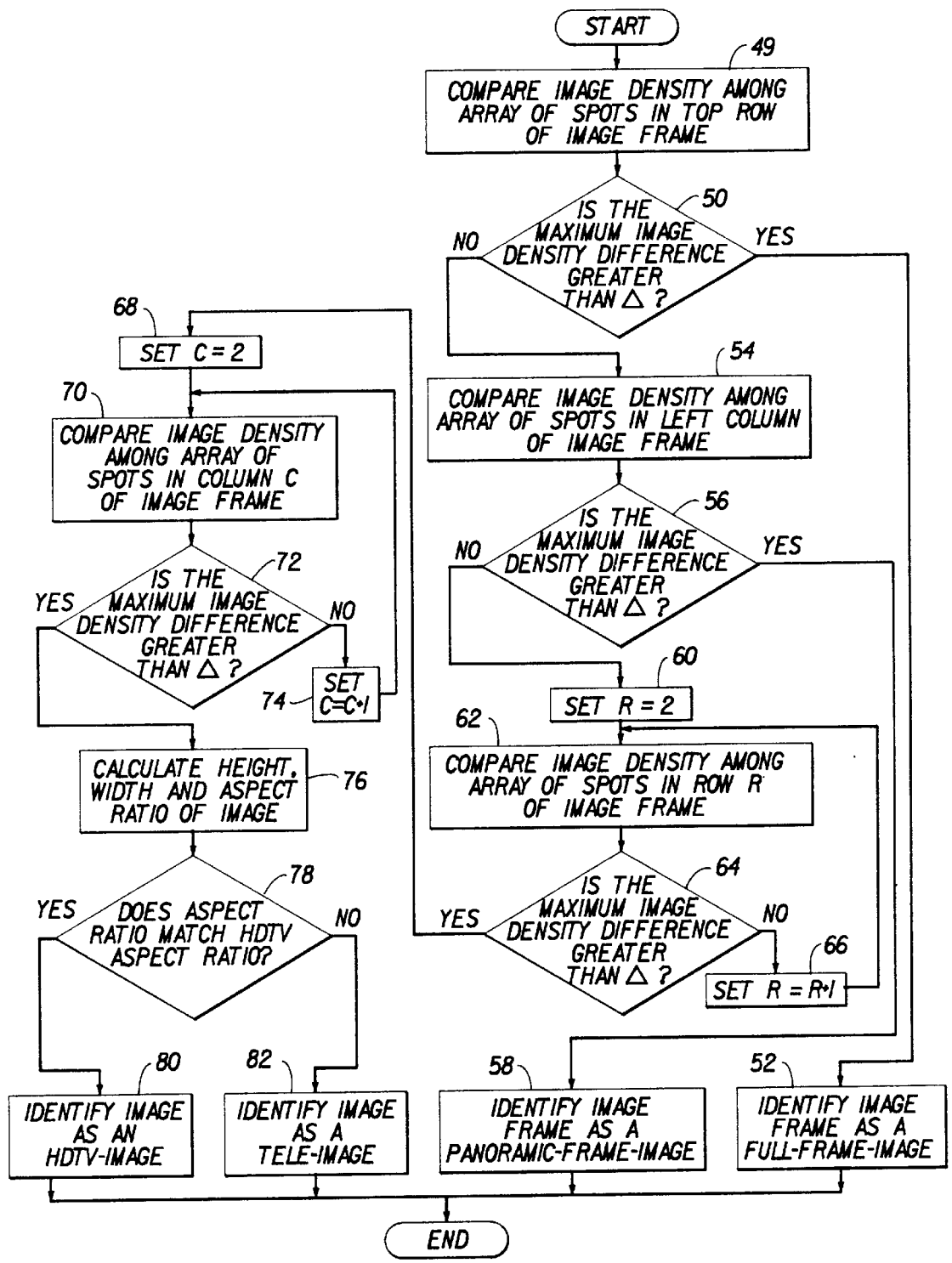
FIG. 3 is a flow diagram which represents a computer program (algorithm logic) forming part of the image printer of FIG. 1.

To this end, reference is made to FIG. 3 in which computer 42 compares the image density among the array of spots in the top row of the image frame as indicated by block 49. If the maximum image density difference between any of these spots is greater than a predetermined difference delta (block 50), then computer 42 concludes that the image is a full-frame-image and proceeds to block 52. At block 52, computer 42 labels the image frame as a full-frame-image. The level of difference delta is set such that it is small enough to not be misled by very plain scenes (sky, snow, etc.).

Returning to block 50, if the maximum image density difference between any spots in the top row is not greater than delta (block 50), then computer 42 concludes that the image is a reduced-height image and proceeds to block 54. At block 54, computer 42 compares the image density among the array of spots in the left column of the image frame. If the maximum image density difference between any of these spots is greater than delta (block 56), then computer 42 concludes that the image is a full-width image and proceeds to block 58. Since the frame is a reduced-height and full-width image, computer 42 identifies the aspect ratio for the image frame as a panoramic-frame-image at block 58.

Returning to block 56, if the maximum image density difference between any of the spots in the left column is not greater than a predetermined difference delta, then computer 42 concludes that the image frame is a reduced-width and reduced-height image. Now computer 42 must determine by how much the height and width of the image are reduced.

At block 60, a variable R is set equal to 2. At block 62, the image density among the array of spots in row R is compared. At this point, computer 42 is looking at the second row in from the top of the image. If the maximum image density difference between any spots in the second row is not greater than delta (block 64), then computer 42 concludes that the image is further reduced in height and proceeds to block 66. At block 66, variable R is set equal to R+1 and the logic returns to block 66. This process is repeated until the computer determines at block 64 that the maximum image density difference between any spots in row R is greater than delta. Now the computer knows it is at an "imaged" row.

The logic now proceeds to a block 68 where a variable C is set equal to 2. At block 70, the image density among the array of spots in column C is compared. At this point, computer 42 is looking at the second column in from the left of the image. If the maximum image density difference between any spots in the second column is not greater than delta (block 72), then computer 42 concludes that the image is further reduced in width and proceeds to block 74. At block 74, variable C is set equal to C+1 and the logic returns to block 70. This process is repeated until the computer determines at block 72 that the maximum image density difference between any spots in column C is greater than delta. Now the computer knows it is at an "imaged" column.

Computer 42 now knows by how many rows on the top and how many columns on the left the image size is reduced. The computer then presumes a corresponding reduction in size in the bottom of the image and the right size of the image. Based on this information, the computer calculates a height, width and aspect ratio of the image at block 76. At a block 78, the logic compares the calculated aspect ratio of the image with the aspect ratio for an HDTV image which is 9/16 or 0.56. If the aspect ratio of the image matches the HDTV aspect ratio within a small margin of error, then the image is labeled as an HDTV image at block 80. If the aspect ratio of the image does not match the HDTV aspect ratio, then the image is labeled as a TELE image at block 82.

Figure 7:
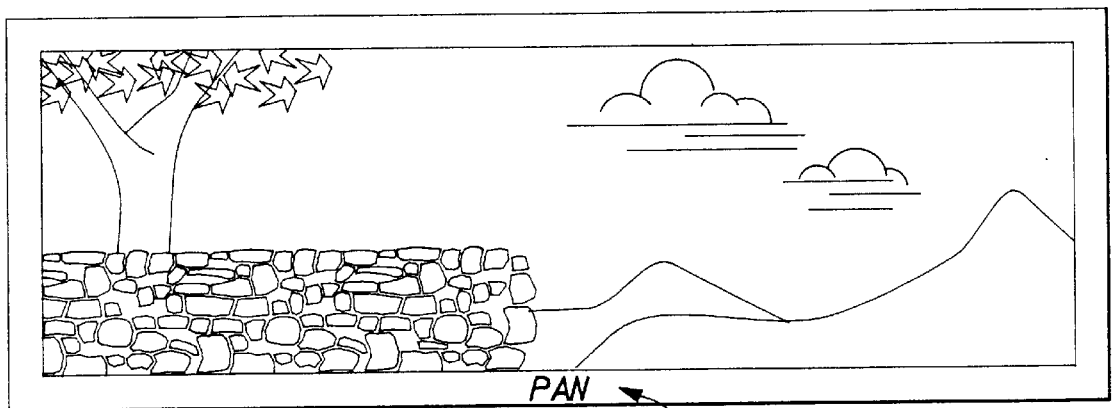
FIGS. 7–9 are diagrams of service prints including an alphabetic description of the aspect ratio for each service print.
Figure 8:
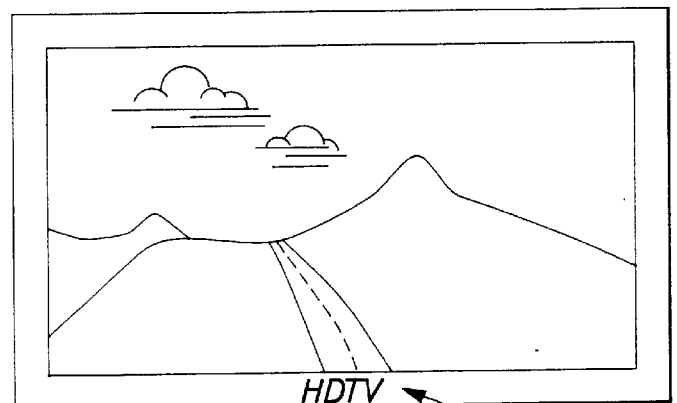
Figure 9:
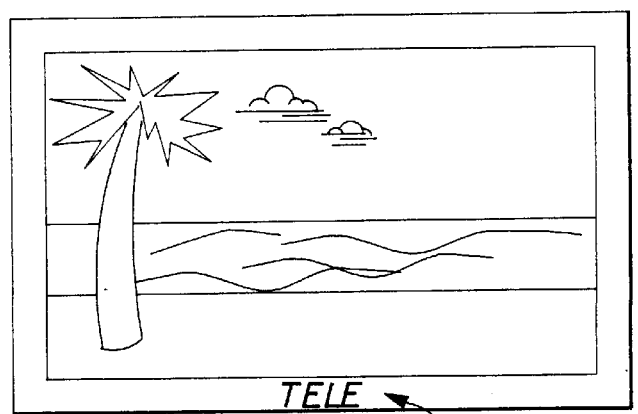

With reference to FIG. 1, after computer 42 has determined the aspect ratio for a particular image, the stored image data for that image is then output from the computer along a path 45 to means, such as hard copy printer 46, for generating the desired service print (described in FIGS. 7–9). Hard copy printer 46 may be any well known form of black-and-white or color printer, depending on the nature of the prints being produced. Examples of suitable printers would be a thermal dye printer, inkjet printer, laser printer, electrophotostatic printer or the like. The image data is adjusted for color and/or density corrections using exposure correction data applied by computer 42 to the printer 46. Computer 42 operates in a well known manner to determine the correct exposure values for printing the service print.

The digital data at the output of processor 40 is also applied to index print generator 44 where the digital data is processed and stored as a matrix of film frame image signals suitable for use in producing an image print. The aspect ratio designation for each image is supplied to index print generator 40 from computer 42. Index print generator 40 uses the aspect ratio designations to alter the matrix of film frame image signals in order to provide a visible aspect ratio indicator for non-full frame images on the index print. Suitable examples of arrangements for producing an index print matrix from scanned image data are described in U.S. Pat. Nos. 4,903,068 and 4,933,773, the disclosures of which are incorporated herein by reference.

The index print generator 44 receives the 480V by 252 H data from the scanner 18 and processor 40 for use in processing and storing the index print information. In a particularly preferred form of the invention, index print generator 44 is adapted to process this data in several modes, depending upon the specific requirement of a output printer system 46. For example, the image data from A/D data processor 40 can be processed and stored in generator 44 in full 480V by 252 H resolution for high quality index prints. Alternatively, the data can be buffered (stored) in, for example, a 160V by 252 H resolution for medium quality index prints or in 24V by 36 H resolution for lower quality index prints, all depending on the output printer system image resolution printing characteristics.

Optionally, a frame number reader 41 is provided to input frame counts to index print generator 44 to keep track of the accumulated number of film frames stored in generator 44 and also to correlate the frame numbers to the individual images in the index print matrix.

The scanned film frame image signals used to generate the index print signal data may be applied directly to an output printer without any exposure correction or they may be adjusted for color and/or density corrections using exposure correction data applied on line 48 from computer 42 to the index print generator 44. Computer 42 operates in a well known manner to determine the correct exposure or digital printing values for printing the index print. In the latter case, the appearance of the index prints is improved to correspond to the appearance of the associated service prints.

When a predetermined number of print images are accumulated in index print generator 44, the stored image data is then output to hard copy printer 46 for generating the desired index print, which is described below with reference to FIGS. 4–6.

Figure 4:
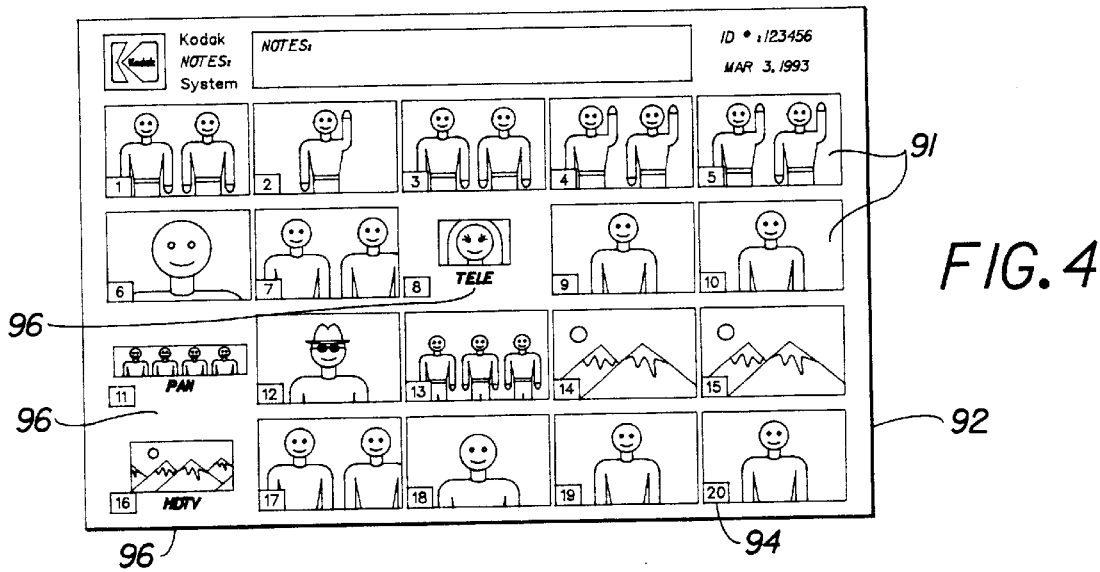
FIGS. 4–6 are index prints including an alphabetic description of the aspect ratio for at least one image on the index print.
Figure 5:
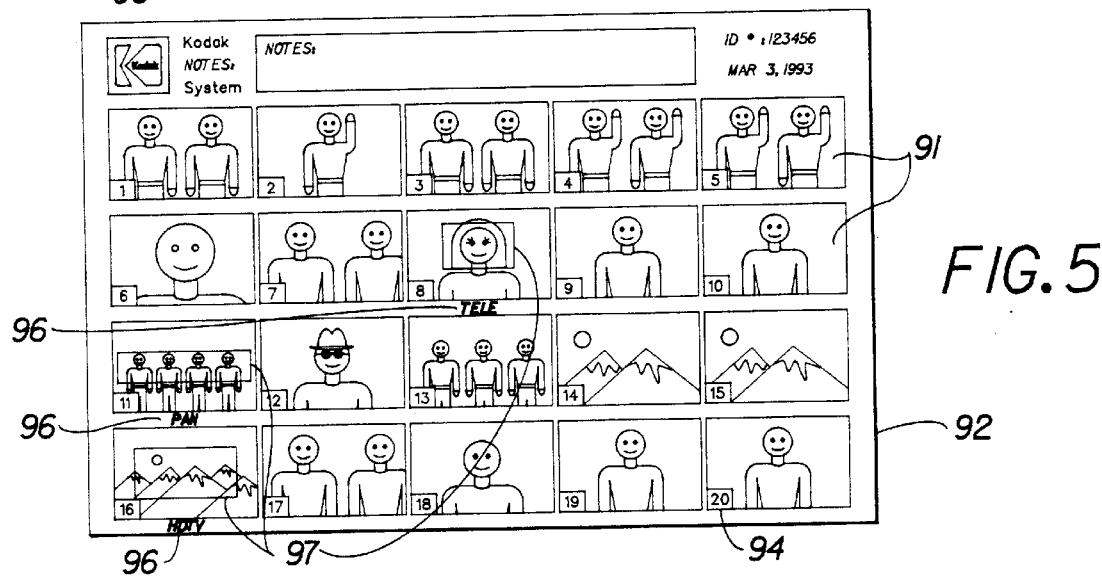
Figure 6:
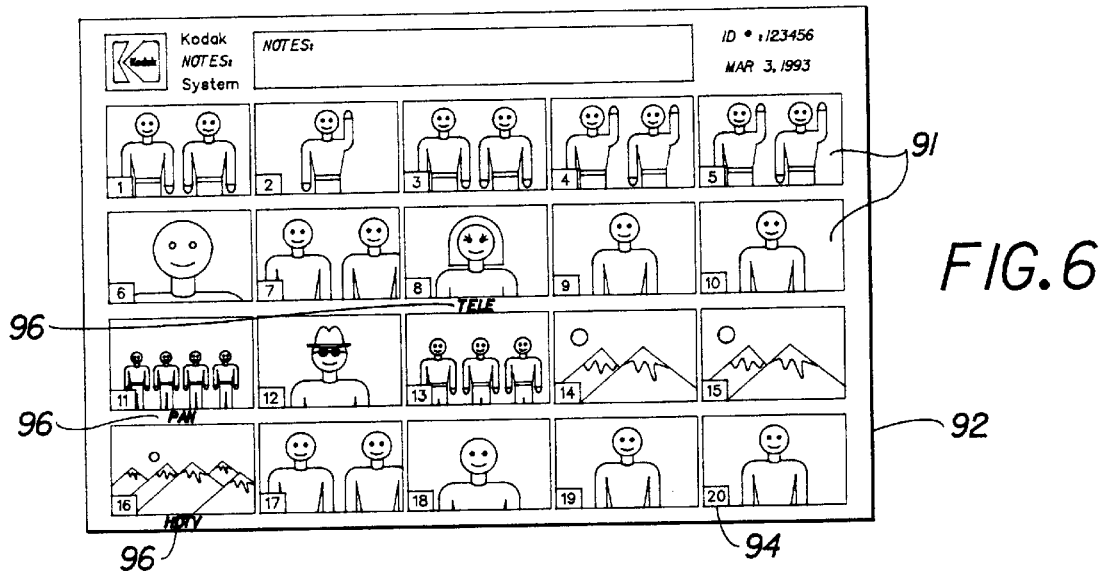

In FIGS. 4–6, representative index prints are shown as comprising a matrix of small-sized positive images 91 printed on a recording sheet 92. The positive images correspond to a predetermined series of image frames (20 in this example) on a roll or strip of photographic film. Each of the index print images preferably bears an image frame number 94 that correlates the particular image on the index print to the corresponding frame image on the photographic film. Thus, a customer can easily determine the content of a film roll or strip without the need to physically view the film. This is of course particularly useful when reordering prints from a photofinisher.

In FIG. 4, a visible aspect ratio indicator, such as an alphabetic description 96, is shown associated with and adjacent images 8, 11 and 16. These alphabetic descriptions (e.g. "PAN", "TELE", "HDTV") assist a viewer of the index print in quickly discerning the designated aspect ratio of the associated image stored on film 14 for non-full frame images. With full frame images, it is preferable that no alphabetic description is used. Note that positive images 8, 11 and 16 have the same aspect ratio as the designated aspect ratio for the corresponding image recorded on film 14, thus providing a further visible indicator of the designated aspect ratio.

In a second embodiment of the invention, the designated aspect ratio of the images is not determined by analyzing the image densities of the images recorded on film 14. Rather, the designated aspect ratio is recorded on, for example, a magnetic strip located on the film. This method is disclosed in Japanese Kokai patent Application No. HEI 5[1993]-27406 the disclosure of which is incorporated herein by reference. Alternatively, the designated aspect ratio can be recorded as an optical "fat bit" on film 14 adjacent the image or on a companion RAM chip loaded in the camera. This embodiment is useful in a "pseudo TELE/PAN" system in which all images are recorded on the film in a full frame format and a designated aspect ratio for non-full-frame images is recorded on the magnetic strip. When the photofinisher processes the film, the designated aspect ratio is read from the magnetic strip and only part of the image recorded on film 14 is used to create service prints.

In this embodiment, reader 41 is adapted to read the designated aspect ratio from the magnetic strip on film 14. The designated aspect ratio is passed directly to index print generator 44, which utilizes the aspect ratio information in creating the index print, and to computer 42, which utilizes the aspect ratio information in creating the service prints.

Turning to FIGS. 5 and 6, index prints are shown in which all positive images 91 on the index print are recorded as full-frame images. However, for positive images 8, 11 and 16, which have a non-full-frame designated aspect ratio, an alphabetic description 96 is provided adjacent the respective positive image to indicate the designated aspect ratio. In images 8, 11 and 16, the positive images have an aspect ratio different from the designated aspect ratio. In FIG. 5, vertical and horizontal lines 97 are also provided over positive images 8, 11 and 16 on the index print to visibly indicate a non-full-frame designated aspect ratio of a corresponding image stored on a negative film. Of course, the index print in FIG. 4 can also be created in this embodiment. As such, only that portion of the image recorded on film 14 corresponding to the designated aspect ratio is printed as a positive image on the index print.

Turning to FIGS. 7–9, service prints 95 and 98–99 created by printer 46 are shown. Each service print includes an alphabetic description 100, such as "PAN", "TELE", OR "HDTV" which assists the viewer in determining the aspect ratio of the picture being viewed. The alphabetic description can be provided on the front or back of the service print. Note that the HDTV and TELE images have similar aspect ratios. If no alphabetic indicator were provided, the viewer would not be able to discern HDTV images from TELE images. By providing an alphabetic indicator, the viewer is greatly assisted in ascertaining the aspect ratio of the image.

The invention has been described in detail with particular reference to a presently preferred embodiment, but it will be understood that variations and modifications can be effected within the spirit and scope of the invention. For example, although a digital method of creating index prints with alphabetic descriptions has been described, an optical method for creating such index prints can be used. Such an optical method is disclosed in the above-referenced U.S. Patent Ser. No. 08/040,398 which is incorporated herein by reference.

PARTS LIST

14 Photographic Film
14a–d Images
15 Supply Reel
16 Take-up Reel
18 Film Scanner 19 Light Source
20 Frame Gate
21 Lens
22 Image Sensor
34*a–d* Spots
36 Film Frame
40 A/D Data Processor
41 Frame Number Reader
42 Computer
44 Index Print Generator
45 Path
46 Output Printer
48 Data Line
49–82 Logic Blocks
91 Positive Image
92 Recording Sheet
94 Image Frame Number
96 Alphabetic Description
97 Vertical and Horizontal Lines
95, 98–99 Service Prints
100 Alphabetic Indicator

We claim:

1. A method of making an image print having one or more positive images representing one or more corresponding images located on an image recording medium, comprising the steps of:

automatically analyzing said one or more corresponding images to determine an aspect ratio for each of said one or more corresponding images;

recording a positive image for each of said one or more corresponding images onto a recording sheet; and providing one or more visible indicators on said recording sheet, said one or more visible indicators being associated respectively with one or more positive images for indicating the aspect ratio of said one or more corresponding images.

2. The method of claim 1, wherein said recording step is effective to record a plurality of positive images on said recording sheet.

3. The method of claim 1, wherein said image recording medium is a photographic film, and wherein said analyzing step includes the steps of:

scanning at least part of each of said one or more corresponding images to obtain image densities of a plurality of areas for each of said one or more corresponding images; and comparing said image densities for each of said one or more corresponding images to determine said aspect ratio for each of said one or more corresponding images.

4. The method of claim 1, wherein said providing step is effective to provide one or more alphabetic descriptions on said recording sheet which indicates said aspect ratio for each of said one or more corresponding images.

5. The method of claim 1, wherein said providing step is effective to provide vertical and/or horizontal lines on one or more of said positive images which indicates said aspect ratio for one or more corresponding images.

6. The method of claim 1, wherein said providing step is effective to control said recording step such that said one or more positive images are recorded at said aspect ratio of said one or more corresponding images.

* * * * *